United States Patent
Chaizy

(10) Patent No.: US 10,490,330 B2
(45) Date of Patent: Nov. 26, 2019

(54) MAGNETO-MECHANICAL CLAMPING DEVICE

(71) Applicant: INELXIA LIMITED, Oxfordshire (GB)

(72) Inventor: Patrick Andre Chaizy, Oxfordshire (GB)

(73) Assignee: INELXIA LIMITED, Oxfordshire (GB)

( * ) Notice: Subject to any disclaimer, the term of this patent is extended or adjusted under 35 U.S.C. 154(b) by 373 days.

(21) Appl. No.: 15/325,505

(22) PCT Filed: Jul. 13, 2015

(86) PCT No.: PCT/GB2015/052015
§ 371 (c)(1),
(2) Date: Jan. 11, 2017

(87) PCT Pub. No.: WO2016/005774
PCT Pub. Date: Jan. 14, 2016

(65) Prior Publication Data
US 2017/0162312 A1 Jun. 8, 2017

(30) Foreign Application Priority Data

Jul. 11, 2014 (GB) .................................. 1412381.4
Jul. 11, 2014 (GB) .................................. 1412386.3

(51) Int. Cl.
*H01F 7/02* (2006.01)
*F16B 2/12* (2006.01)

(52) U.S. Cl.
CPC ............. *H01F 7/0252* (2013.01); *F16B 2/12* (2013.01); *H01F 7/0263* (2013.01)

(58) Field of Classification Search
CPC ......... H01F 7/0252; H01F 7/0263; F16B 2/12
See application file for complete search history.

(56) References Cited

U.S. PATENT DOCUMENTS 6,477,749 B1 * 11/2002 Reiter ..................... A41F 1/002
24/303
2005/0023841 A1 * 2/2005 Chen ....................... E05C 19/16
292/251.5
(Continued)

FOREIGN PATENT DOCUMENTS

CN 1206490 A 1/1999
EP 0 866 476 A1 9/1998
(Continued)

OTHER PUBLICATIONS

International Search Report, dated Nov. 13, 2015, and Written Opinion issued in International Application No. PCT/GB2015/052015.
(Continued)

*Primary Examiner* — Mohamad A Musleh
(74) *Attorney, Agent, or Firm* — Saul Ewing Arnstein & Lehr LLP

(57) ABSTRACT

A clamping mechanism comprising a first part provided with a first magnetic component, a second part, and a third part provided with a second magnetic component and being coupled to the second part. The mechanism is such that, bringing the first and second parts together along an axis causes rotational alignment and relative radial movement of the first and second magnetic components to effect axial clamping of the first part to the second part, and wherein relative rotation of the first and third parts to misalign the first and second magnetic components reverses this radial movement and effects unclamping of the first and second parts.

12 Claims, 10 Drawing Sheets

(56) References Cited

U.S. PATENT DOCUMENTS

| | | | | |
|---|---|---|---|---|
| 2009/0250574 A1* | 10/2009 | Fullerton | ............... | G09F 7/04 |
| | | | | 248/206.5 |
| 2009/0278642 A1* | 11/2009 | Fullerton | ............ | G01D 18/00 |
| | | | | 335/284 |
| 2010/0283269 A1 | 11/2010 | Fiedler | | |
| 2010/0308605 A1 | 12/2010 | Fiedler | | |
| 2011/0138583 A1* | 6/2011 | Fiedler | ............... | A44B 11/25 |
| | | | | 24/303 |
| 2011/0298227 A1 | 12/2011 | Fiedler | | |

FOREIGN PATENT DOCUMENTS

| | | | | |
|---|---|---|---|---|
| WO | 2008/006357 A2 | 1/2008 | | |
| WO | 2009/092368 A2 | 7/2009 | | |
| WO | 2010/084191 A1 | 7/2010 | | |
| WO | WO-2012160195 A2 * | 11/2012 | ......... | H01F 7/0242 |
| WO | 2013/190070 A2 | 12/2013 | | |

OTHER PUBLICATIONS

Office Action, dated Oct. 30, 2017, issued in Chinese Application No. CN 201580037116.5.

* cited by examiner

MAGNETO-MECHANICAL CLAMPING DEVICE

CROSS REFERENCE TO RELATED APPLICATIONS

This application claims the priority of International Application No. PCT/GB2015/052015, filed on Jul. 13, 2015, which claims priority to GB Application No. 1412381.4, filed Jul. 11, 2014, and GB Application No, 1412386.3, filed Jul. 11, 2014, the entire contents of each of which are fully incorporated herein by reference.

TECHNICAL FIELD

The present invention relates to a magneto-mechanical clamping device.

BACKGROUND

Various magnetic fixing arrangements are described in the following documents: U.S. Pat. No. 8,368,494, WO/2012/160195, DE145325.

SUMMARY

According to a first aspect of the present invention there is provided a clamping mechanism comprising a first part provided with a first magnetic component, a second part, and a third part provided with a second magnetic component and being coupled to the second part. The mechanism is such that, bringing the first and second parts together along an axis causes rotational alignment and relative radial movement of the first and second magnetic components to effect axial clamping of the first part to the second part, and wherein relative rotation of the first and third parts to misalign the first and second magnetic components reverses this radial movement and effects unclamping of the first and second parts.

Further aspects of the invention are set out in the appended claims.

DETAILED DESCRIPTION

Figure 1:
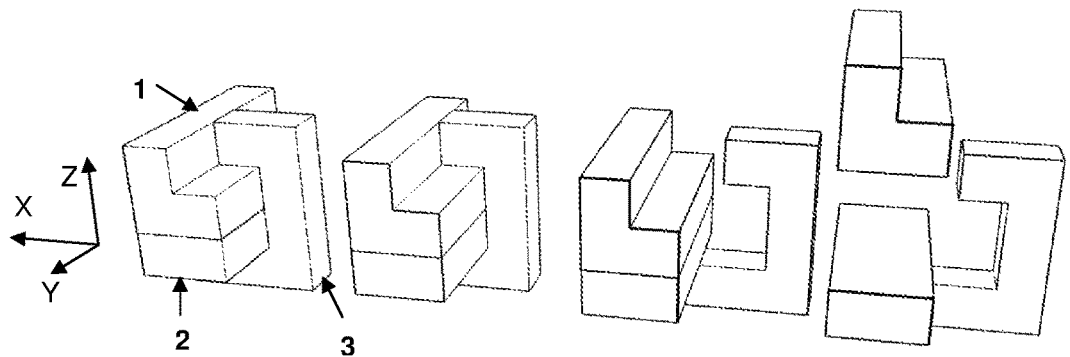
FIG. 1 is a perspective view of an embodiment of the clamping device, illustrating a clamped and an unclamped position, in which the actuation motion is linear.

A first part (1) is prevented to move relatively to a second part (2), along a $1^{st}$ direction (Z), by a third part (3) that clamps the two parts (1) and (2). The third part (3) can move from a clamping to an unclamping position and vice versa. The motion, along a $2^{nd}$ direction (X), of the third part (3) to its clamping position is activated by a magnetic force. In addition, this magnetic force can be used as a way of maintaining the system clamped and/or as a force that guides the path of the first part (1) relatively to the second (2) and third part (3) during the clamping process. The motion, along the $2^{nd}$ direction (X), of the third part (3) to its unclamping position is activated by a force that is triggered by moving, along a $3^{rd}$ direction (Y), the third part (3) relatively to the first part (1).

FIG. 1 illustrates the principle of the mechanism. It provides a sequence of actions described next. From left to right, the system goes from clamped to unclamped. First, the first part (1) and the second part (2) are prevented to move, relatively to each other's, along the Z direction by clamp (3); the system is said to be clamped. Second, clamp (3) is moved, relatively to the first part (1), along the Y direction; this motion is called, hereafter, the actuation motion. Third, this actuation motion enables a force to move clamp (3) away from the two parts (1) and (2); the system is said to be unclamped. However, clamp (3) needs to move in the Y direction to align itself with its final clamping position before or when it starts moving in the +X direction. Otherwise, clamp (3) will still be maintained away from the first (1) and second (2) parts by the unclamping force. This motion of clamp (3) in the Y direction can be activated by the magnetic force that pulls clamp (3) towards the first (1) and second (2) parts or by another force (e.g. a manual force, another magnetic force, a spring etc . . . )

Inversely, from right to left, the system goes from unclamped to clamped. First and second, the first part (1) and the second part (2) are moved closer to each other's along the Z direction; clamp (3) is unclamped and in the vicinity of the second part (2). Third, when the two parts (1) and (2) are closed enough to each other's, the magnetic force acting on both the first part (1) and clamp (3) moves clamp (3) closer to the two parts (1) and (2). As a result the first (1) and second (2) parts are prevented to move along the Z direction, relatively to each other's, by clamp (3); the system is clamped. However, clamp (3) needs to move in the Y direction to align itself with its final clamping position before or when it starts moving in the +X direction. Otherwise, clamp (3) will still be maintained away from the first (1) and second (2) parts by the unclamping force. This motion of clamp (3) in the Y direction can be activated by the magnetic force that pulls clamp (3) towards the first (1) and second (2) parts or by another force (e.g. a manual force, another magnetic force, a spring etc . . . ).

By definition, a paramagnetic material is only attracted when in the presence of an externally applied magnetic field, a diamagnetic material is repelled by magnetic fields, an antimagnetic material is impervious to the effect of a magnetic field, and a ferromagnetic material is used to make magnet or is attracted to magnets.

The clamping magnetic force is generated by two magnetic components. One of the components, hereafter called the first magnetic component, is a magnet. The other one, hereafter called the second magnetic component, is either a magnet or made of ferromagnetic/paramagnetic material. One magnetic component is located on the first part (1) and the second one on the clamp (3). Thus when the first part (1) moves closer to the second part (2) and to clamp (3) the magnetic force will gain strength up to the point that it is strong enough to move clamp (3) in its clamping position.

In order to unclamp the system, the motion of clamp (3) along the Y direction either reduces (i.e. modulate) the strength or reverse the direction of the clamping magnetic force. If the clamping magnetic force is reversed then the second magnetic component is either another magnet, or is made of some diamagnetic material. If the second magnetic component is also a magnet, i.e. if it is not made of a diamagnetic material, then the magnetic orientation of the first and second magnets must be such that the two magnets push each other away after the actuation motion has been executed. If the clamping magnetic force is reduced then the unclamping force is already presents when the system is clamped but its strength is lower than the magnetic force one. It is only when the strength of the magnetic force has reduced enough that clamp (3) can be moved away from the two parts (1) and (2) by this unclamping force (typically a force generated by a spring).

Figure 2:
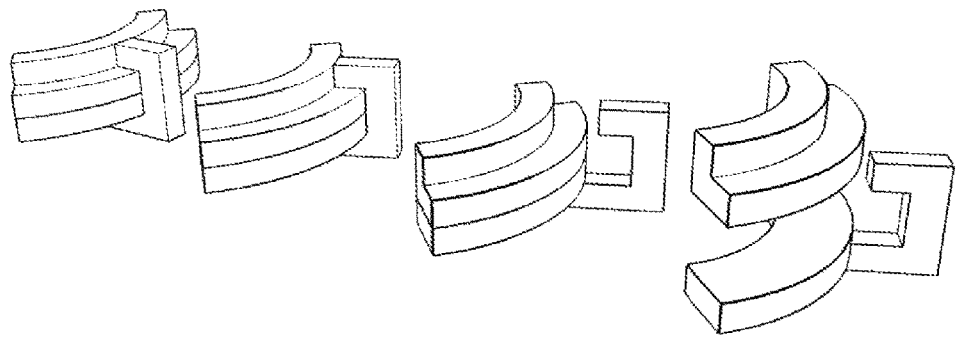
FIG. 2 is a perspective view of an embodiment in which the actuation motion is circular.
Figure 3:
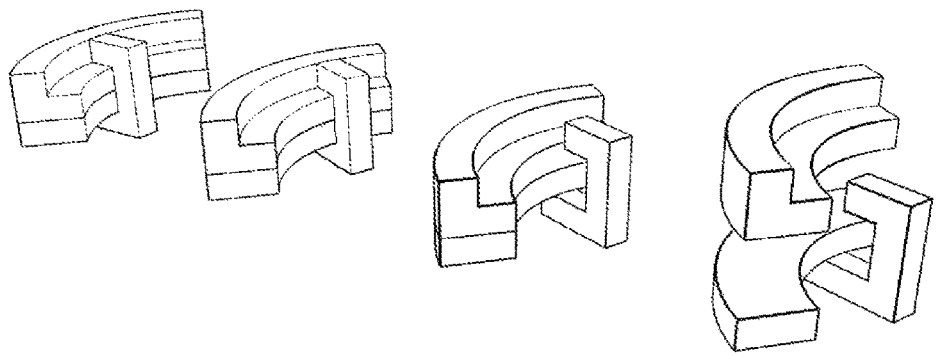
FIG. 3 is a perspective view of a further embodiment in which the actuation motion is circular.

In FIG. 1 the actuation motion is linear. However, it can be circular, rotating around an axis that is parallel to the Z direction. This is illustrated in FIG. 2 and FIG. 3. In FIG. 2, clamp (3) slides on the external limb of the two parts (1) and (2); the system is said "external". In FIG. 3, clamp (3) slides on the external limb of the two parts (1) and (2); the system is said "internal". In these figures, parts (1) and (2) cover a rotational angle of 90°. This angle could be bigger or smaller. Note that the path of the actuation motion that has been discussed above is either linear or rotational. However, it could be anything.

Figure 4:
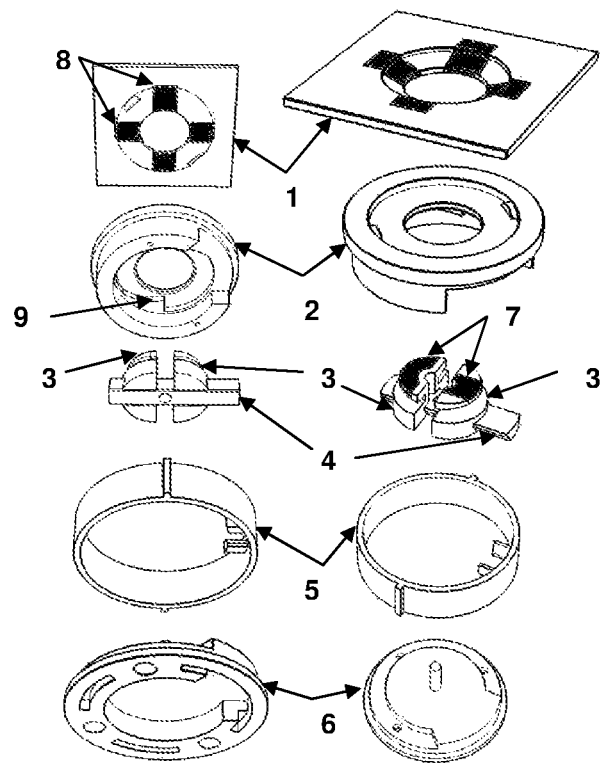
FIG. 4 is an exploded view of an embodiment requiring single-step actuation.

FIG. 4 is an exploded view of an example of embodiment of an internal clamping system. The left and right figures show the various parts from, respectively, a bottom-up and top-down view point. There are two clamps (3). The two clamps can slide along a bar (4). One extremity of the bar (4) lodges inside the actuating part (5). The actuating part (5) rotates around the second part (2) and rotates the bar (4) with it. The rotation of bar (4) leads to the rotation of the clamps (3) relatively to the two parts (1) and (2). The bottom part (6) is screwed on the second part (2). It holds the actuating part (5) around the second part (2).

In this embodiment it has been chosen to insert one magnet (7) inside each clamp (3). These two magnets (7), in black on the figure, can have various sizes and shapes. Their dipoles are orientated so that the two clamps (3) attract each other's to move to the centre of the bar (4). Therefore, the resulting magnetic force between these two magnets (7) constitutes the unclamping force. Consequently the clamping magnetic force only needs to be modulated (i.e. it is not mandatory, although possible, to reverse it) to unclamp the two parts (1) and (2). This is why, in this implementation, the second magnetic component, in black on the figure, can be a magnet or made of ferromagnetic/paramagnetic material (8).

In this embodiment, once clamped, the first part (1) cannot rotate relatively to the second part (2). In addition, a rotation of 45° can reduce the clamping magnetic force enough so that the clamps (3) move away from the two parts (1) and (2). Therefore, when the system is clamped, the relative angular position of the first part (1) relatively to the second part (2) is fixed. However, it can vary by steps of 90°; the rotation having to take place when the system is unclamped.

In order to help the unclamping, the second part (2) has been shaped so that the clamps (3) are not only pulled towards each other's by the magnetic pull but also mechanically pushed away from the two parts (1) and (2) by the edge with a curved shape (9). Such an edge allows increasing the clamping magnetic force without jeopardising the ability to unclamp the system; the magnetic force decreasing with the distance between magnets.

Figure 4A:
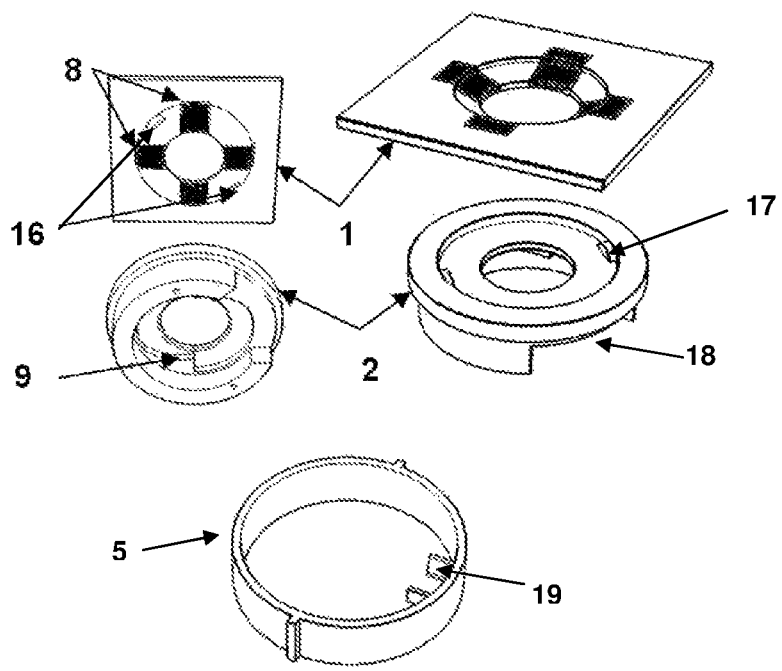
FIG. 4a is a view of some of the components of the embodiment of FIG. 4.

FIG. 4a illustrates how inadvertent disengagement of the first part from the second part is prevented. It is desirable to prevent any accidental rotation of the clamps (3) relative to the second part (2), since this could result in an unexpected disengagement of the first part (1).

Once it is in the clamped position, rotation of the first part (1) relative to the second part (2) is prevented by engagement of indents (16) in the underside of the first part (1) with corresponding protrusions (17) in the upper surface of the second part.

The two clamps (3) are mounted on a bar (4) along which they can slide radially. One end of the bar (4) is engaged within a channel (19) provided on an interior wall of the actuator (5). The bar (4) is therefore rotated as the actuator (5) is rotated. It will be understood from FIG. 4 that the bottom part (6) is screwed on the second part (2). It holds the actuator (5) around the second part (2), therefore the actuator is not fixed and can rotate. However, rotation of the actuator (5) is restricted by a slot (18) formed in the side walls of the second part (2). Once the first part (1) is in the clamped position, the channel (19) of the actuator (5) is located at the top end of the slot (18). Anti-clockwise rotation of the actuator is therefore prevented.

It is possible to rotate the actuator (5) and hence the bar (4) in a clockwise direction. Clockwise rotation of the actuator (5) can continue until the exterior of the channel (19) comes into contact with the other end of the slot (18). At this point, the clamps (3) (which are mounted on the bar (4)) have undergone a clockwise rotation of around 45° and the first part (1) may be disengaged from the second part (2). It will be appreciated that the clockwise rotation of the clamps (3) can only occur by deliberate rotation of the actuator (5) in a clockwise direction. This rotation is resisted by the attractive force between the clamp magnets (3) and the magnets (8) of the first part (1), hence accidental rotation is less likely to occur.

Figure 5:
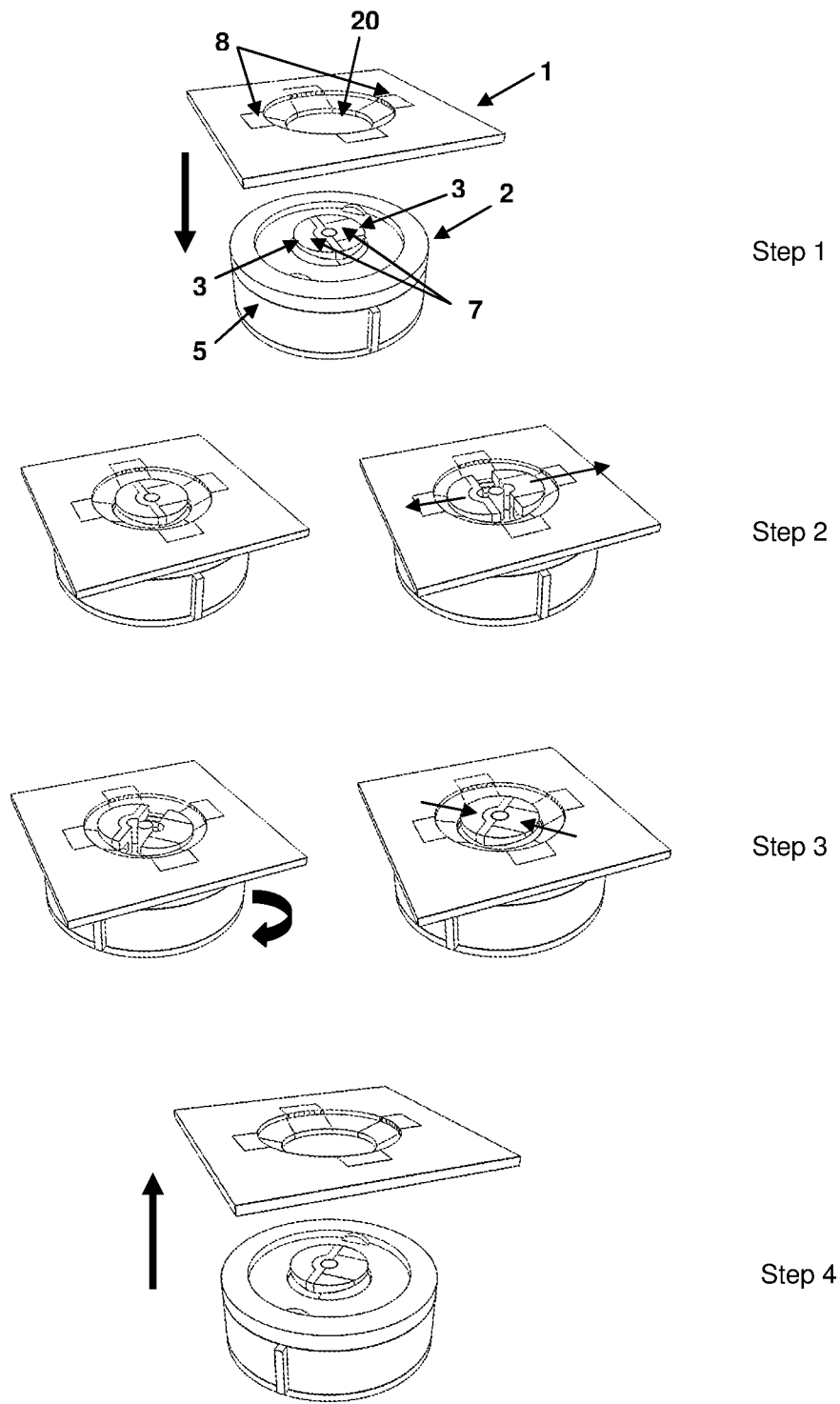
FIG. 5 is a view of the assembled embodiment of FIG. 4, in which the clamping and unclamping process is illustrated.

FIG. 5 represents the assembled system. For the purposes of illustration, the first part (1) may be attached to a smartphone or smartphone case, whilst the second part (2) is attached to a component to which the smartphone or smartphone case is to be attached, e.g. the handlebars of a bicycle. Reference is made to a third part which comprises at least the clamps (3), bar (4), actuator (5), and magnets (7).

The operation of the system of FIG. 5 can be described in the following four steps:

Step 1: Prior to the commencement of the clamping operation, the magnets (7) of the third part cause the clamps (3) to be in a pulled together, or closed, position, due to the attractive force between the magnets (7).

Step 2: As the first part (1) is brought together with the second part (2) and the third part (3), the magnets (8) in the first part (1) attract the clamp magnets (7). The attractive force between the magnets (7) in the clamps (3) and the magnets (8) in the first part (1) automatically draws the first part (1) into position on the second part (2), as shown in the left hand illustration. Depending upon the rotational alignment of the two sets of magnets (7,8), this may involve a rotation of the third part within the second part (2) to a position where the magnets (7,8) are rotationally aligned.

Simultaneously, this attraction causes each of the clamp magnets (7) to move towards the respective magnet (8) of the first part (1), pulling the two clamps (3) apart, i.e. radially outwards, as shown in the right hand illustration. In other words, the attraction between the magnets (8) in the first part (1) and the clamp magnets (7) is sufficiently large to overcome the attraction between the two clamp magnets (7). Hence, each clamp (3) is pulled into a position where it at least partly overlaps a clamping surface (20) of the first part (1). [NB. This clamping surface is bevelled in the sense that it slopes downwardly, in order to reduce the high tolerances that would otherwise be required to ensure a tight clamp.] This overlap holds the first part (1) in position, retaining it against the second part (2). In this position, the first part (1) cannot rotate freely, or move axially, relative to the second part (2), effectively locking the two parts together.

It should be noted that the procedure of step 1 and 2 is largely automatic in that it occurs merely by bringing the first (1) and second (2) parts close together. There is no need for any careful alignment of the parts. The process is self-aligning.

Step 3: In order to release the first part (1) from the second part (2), it is necessary to rotate the clamps (3) relative to the second part (2). This is achieved by the user grasping the actuator (5) with the fingers of one hand, and one or both of the first (1) and second (2) parts with the fingers of the other hand, and rotating. This rotation rotates the clamp magnets (7) out of alignment with the magnets (8) of the first part (1), drawing the clamp magnets (7) and the clamps (3) together. This inward movement of the clamps (3) pulls them off of the clamping surface (20) and thereby releasing the first part (1) from the second part (2). In addition to the decrease in magnetic attraction between the magnets (7, 8) caused by rotation, the unclamping process is assisted by the curved edge (9) in the interior surface of the second part (2), as described in relation to FIG. 4. Rotation of the actuator (5) moves the clamps (3) from the positions shown in the left hand illustration to the positions shown in the right hand illustration.

Step 4: Once the clamps (3) are in the closed position, they no longer overlap the clamping surface (20) of the first part (1) and the first part (1) is therefore unclamped and may be removed from the surface of the second part (2).

When in their clamping position, there will be a gap between the surfaces of the clamps (3) and of the parts (1) and (2) that face each other's. This gap is due to the unavoidable manufacturing tolerances. It allows the parts (1) and (2) to move relatively to each other's and relatively to the clamps (3) in the Z direction. This motion can be prejudicial even if it is small (typically 0.1 mm). In order to remove this gap, the surfaces can be bevelled relatively to the (X,Y) plan. Such a bevelling is illustrated in FIG. 6.

Figure 6:
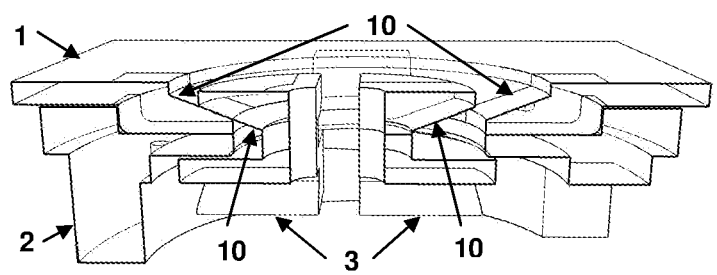
FIG. 6 is a cross section of the assembled system of FIG. 4 with certain parts removed for clarity.

FIG. 6 is a cross section of the assembled system showing only the two parts (1) and (2) and the clamps (3). The left and right clamps are, respectively, clamped and unclamped. It shows that the surfaces (10) of the clamps (3) and of the first part (1) that faces each other's, when the clamps (3) are in their clamping position, are bevelled. The surfaces are in contact in the left clamp, i.e. there is no gap.

It is worth noting that an alternative mechanism is possible. In this mechanism, only one of the two clamps has a magnet. This first clamp is mechanically coupled to the second clamp by some means (e.g. some cables) so that when it moves to its clamping position it pulls (or pushes) the second clamp so that the latter is moved, at the same time as the first clamp, to its clamping position.

Figure 7:
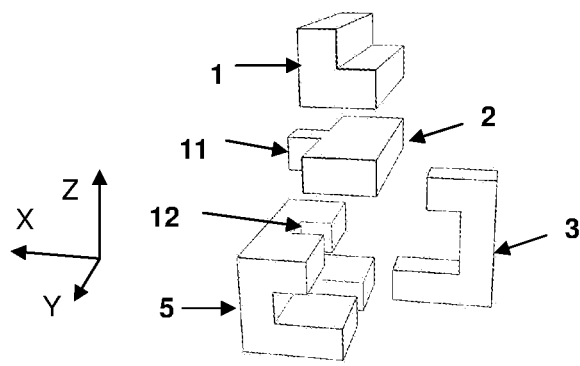
FIG. 7 is an exploded view of an embodiment requiring two-step actuation.

FIG. 1 to FIG. 6 describe a mechanism where only one actuating step is required to unclamp the system; the latter being the motion of clamp (3) relatively to parts (1) along the actuation direction (Y). FIG. 7 and above describe a mechanism that requires two actuating steps to unclamp the system. The first step is a motion of part (1) relatively to an actuating part (5), acting on clamp (3), along a direction that is not inside the (X,Y) plan; i.e. typically along a direction that is parallel to the Z axis. The second actuating step is, as before, the previously described actuation motion of clamp (3) relatively to part (1), along the Y direction. This first actuating step is required because, before it is executed, part (1) and actuating part (5) (and, subsequently, clamp (3)) are prevented to move relatively to each other's in the actuation direction Y. Note that clamp (3) does not have to be mechanically prevented from moving relatively to actuating part (5) along the Y direction before the first actuating step is executed provided that it is after. Again, the second actuating step can be linear, rotational or anything else as already discussed above.

Consequently, an additional force is required to keep part (1) positioned relatively to actuating part (5) so that they cannot move relatively to each other's along the direction of motion of the first actuating step. This can be achieved, typically by a spring or by some magnetic material configured so that they act as a spring. Such a system is useful if, for instance, the first part (1) is so large that it is not possible to access easily the actuating part (5) located behind the first part (1).

Figure 8:
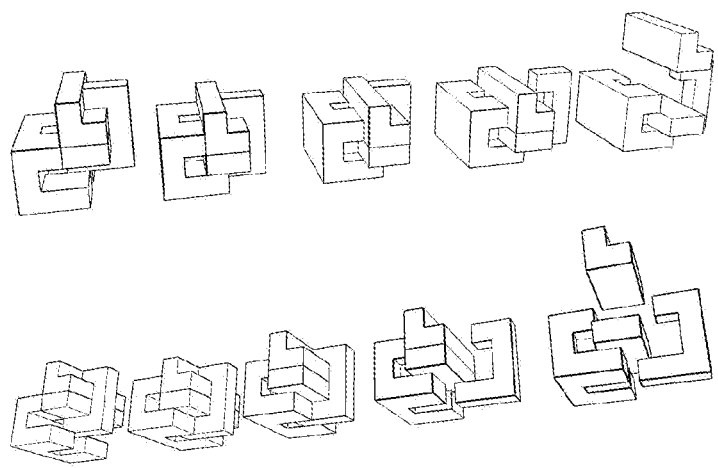
FIG. 8 illustrates the clamping and unclamping of the embodiment of FIG. 7.

This two actuating steps mechanism is illustrated in FIG. 7 and FIG. 8. FIG. 7 is an exploded view of the components involved in FIG. 8. It shows that when the protrusion (11) of the second part (2) is inside the slot (12) carved inside the actuating part (5) the second part (2) and the actuating part (5) cannot move relatively to each other's along the Y direction. In addition, when clamped, parts (1) and (2) cannot move relatively to each other's along the Y direction; thus part (1) cannot move relatively to the actuating part (5). Note that the protrusion could be on the first part (1) or on both parts (1) and (2) and that the locations of the slot and of the protrusion on the parts could be reversed (as it is the case in FIG. 9 and FIG. 10).

FIG. 8 shows the steps required to unclamp and/or to clamp the system described in FIG. 7. The top and bottom figures show the steps from, respectively, a top-down and a bottom-up viewpoints. From left to right, the system goes from clamped to unclamped. First, the system is clamped and parts (1) and (2) cannot move relatively to the actuating part (5) in the Y direction. Second, the first actuating step is executed. As a result, the two parts (1) and (2) and clamp (3) are moved along the −Z directions, relatively to the actuating part (5). Note that they could have moved in the +Z direction. Third, the two parts (1) and (2) moved relatively to both clamp (3) and the actuating part (5), along the Y direction. Fourth, as a result of the previous motion, the unclamping force moves clamp (3) to its unclamping position. Fifth, the first part (1) and the second part (2) can move away from each other's along the Z direction. Note that the clamping manoeuvre can be the opposite sequence of steps, but not necessarily. Indeed, after parts (1) and (2) have been separated, the second part (2) can be moved, relatively to actuating part (5), back to where they were before the first actuating step was executed, but with clamp (3) still in its unclamping position (until the first part (1) is moved again closer to clamp (3)).

Figure 9:
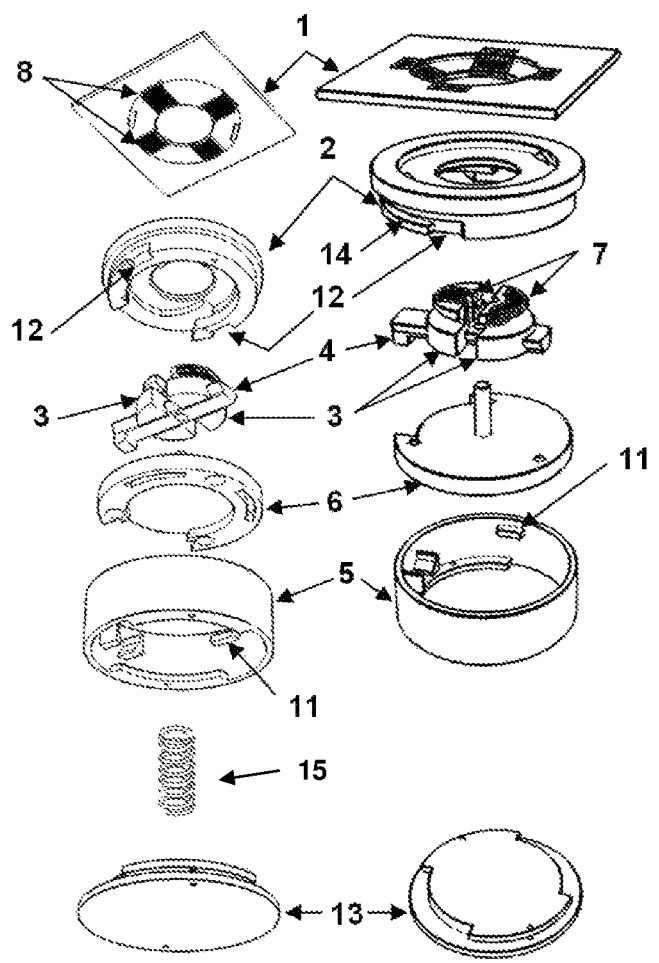
FIG. 9 is an exploded view of a further embodiment requiring two-step actuation.
Figure 10:
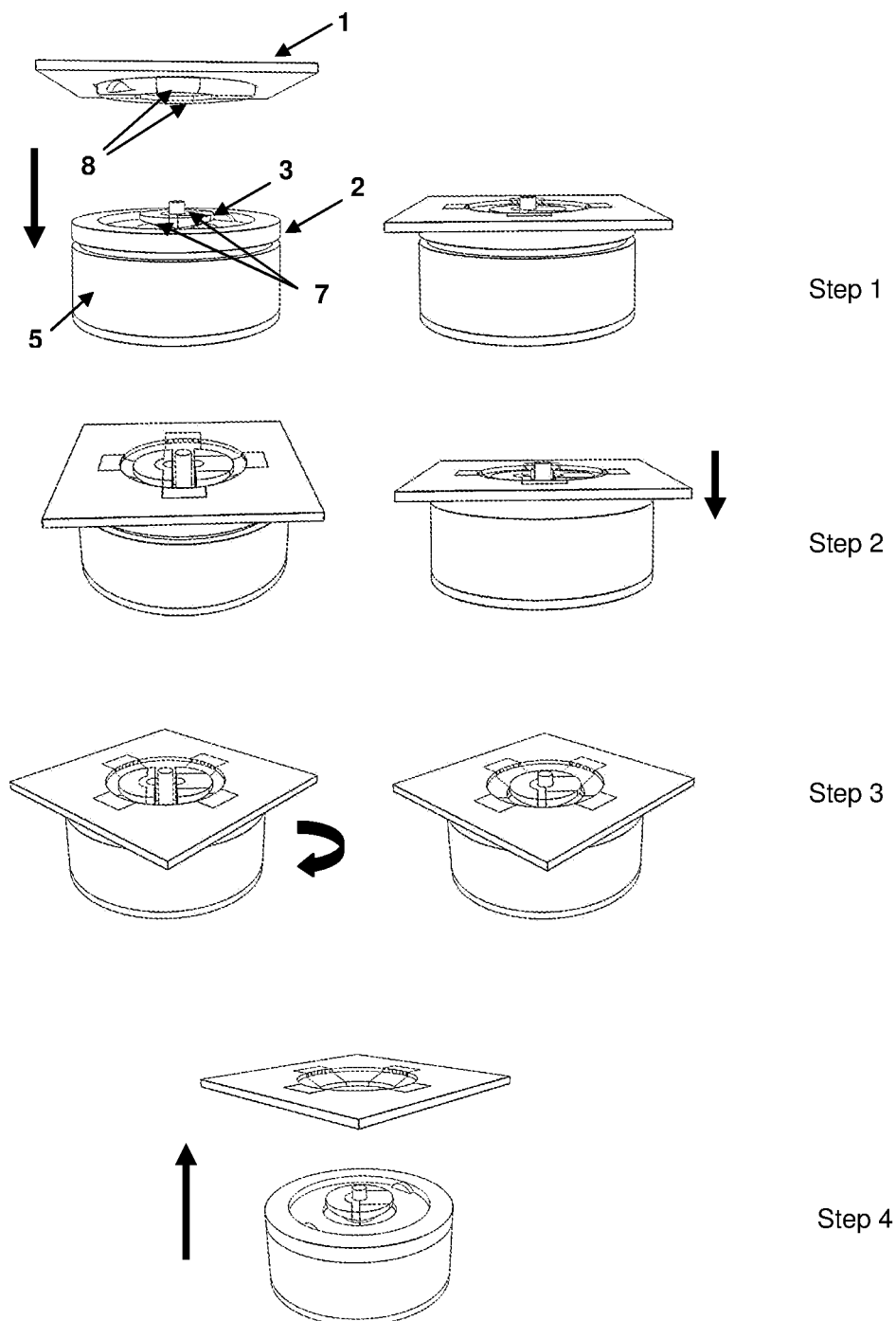
FIG. 10 is a view of the assembled embodiment of FIG. 9, in which the clamping and unclamping process is illustrated.

FIG. 9 and FIG. 10 describe an embodiment that is very similar to the one described in FIG. 4 to FIG. 6. The difference is that this embodiment is a two actuating steps mechanism as discussed in FIG. 7 to FIG. 8; while the previous one is a one actuating step mechanism.

FIG. 9 is an exploded view. The left and right figures show the various parts from, respectively, a bottom-up and top-down view point. Contrary to FIG. 7 and FIG. 8, the protrusion (11) and the slot (12) are associated, respectively, to the actuating part (5) and to the second part (2). The bottom lid (13) is screwed on the actuating part (5) and acts as a bottom lid of the actuating part (5). A force continuously pushes the bottom part (6), and the second part (2), away from the bottom lid (13), to ensure that, when clamped, protrusion (11) stays in slot (12) and does not go inside groove (14). It could be generated, typically, by a spring (15) located between the bottom part (6) and the bottom lid (13). It could also be generated by magnets acting as a spring. When the second actuating step is executed, against this previously mentioned force, the protrusion (11) can slide horizontally inside groove (14) when the two parts (1) and (2) rotate relatively to the clamps (3) and to the actuating part (5).

FIG. 10 is a view of the assembled embodiment of FIG. 9. For the purposes of illustration, the first part (1) may be attached to a rear surface of a television or a monitor, whilst the second part (2) may be attached to a wall.

The operation of the system of FIG. 10 can be described in the following four steps identified in the Figure:

Step 1: Prior to commencement of clamping, the clamps (3) are in a closed position, pulled together by the attractive force between the two clamp magnets (7). As the first part (1) is brought together with the second part (2), the clamp magnets (7) are attracted to the magnets (8) of the first part (1) and the first part (1) is drawn into position on the surface of the second part (2). This position is shown in the right hand illustration.

Simultaneously, each of the clamp magnets (7) moves towards the respective magnet (8) of the first part, pulling the clamps (3) into an open position. In other words, the attraction between the clamp magnets (7) is overcome by the attraction between each clamp magnet (7) and its respective first part magnet (8). Once in the clamped position, the first part (1) is retained on the surface of the second part (2) by the clamps (3), which at least partially overlap a clamping surface of the first part (1).

Step 2: The base (13) is held apart from an underside (6) of the second part (2) by a spring (15), as discussed with reference to FIG. 9 above. Pushing down on or applying a compressive force to the upper surface of the first part (1) (or on a component attached thereto, such as a television), compresses the spring (15). This allows the protrusion (11) on the inner wall of the actuator (5) to slide into a groove (14) in an outer wall of the second part (2), thus enabling rotation of the first (1) and second (2) parts.

Step 3: Rotation of the first (1) and second parts (2) relative to the actuator (5) and the clamps (3) also rotates the magnets (8) of the first part. It will be understood from FIG. 9 that the actuator (5) is connected by screws to the bottom lid (13), which may be fixed to a wall, for example. Therefore, the actuator (5) cannot rotate, and it is the second part (2) which rotates relative to the actuator (5) once protrusion (11) engages with groove (14). Since the clamps (3) are mounted on the bar (4), which is engaged with the actuator (5), the clamps (3) themselves cannot rotate. As the magnets (8) of the first part (1) are rotated away from the clamp magnets (3), the attractive force between them decreases until it is exceeded by the attractive force between the clamp magnets (7) themselves.

Step 4: The clamps (3) are then pulled back into a closed position, wherein they no longer overlap the clamping surface of the first part (1) and the first part (1) may be disengaged from the surface of the second part (2).

The advantage of the system described in FIG. 10 is that unclamping may be effected by a "push-twist" process, in which it is not necessary to access the actuator (5) or indeed the clamping device at all. This is particularly advantageous when the device is used to fix a television or monitor to a wall, and access to the rear of the television or monitor is limited.

FIG. 10 represents the assembled mechanism as well as the sequence of steps required to unclamp the system. First, the system is clamped. The two parts (1) and (2) cannot rotate relatively to the actuating part (5). Second, the two parts (1) and (2) and the clamps (3) have been pushed down relatively to the actuating part (5). Third, the two parts (1) and (2) have been rotated relatively to the clamps (3) and to the actuating part (5). Fourth, the first part (1) is moved away from the other parts. Note that, once done, another force can be added to rotate the second part (2) back and, subsequently, also move the protrusion (11) back inside slot (12). This force can be generated, typically, by a spring. It could also be generated by the magnets (7) inside the clamps (3) and some ferromagnetic/paramagnetic material located inside the second part (2). However, such a magnetic force must be strong enough to rotate the second part (2) and its bottom part (6) but weak enough not to move the clamps (3) from their unclamping position; otherwise they would prevent the first part (1) to move close enough to the second part (2) when the system is being clamped.

Figure 11A:
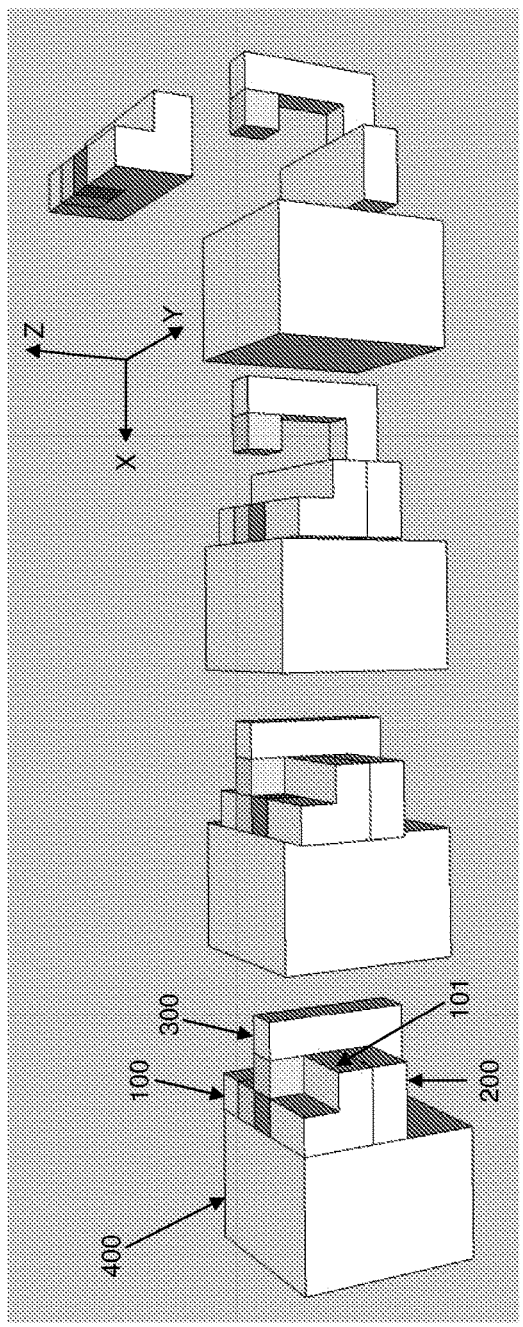
FIG. 11 further illustrates a linear clamping and unclamping mechanism.
Figure 11B:
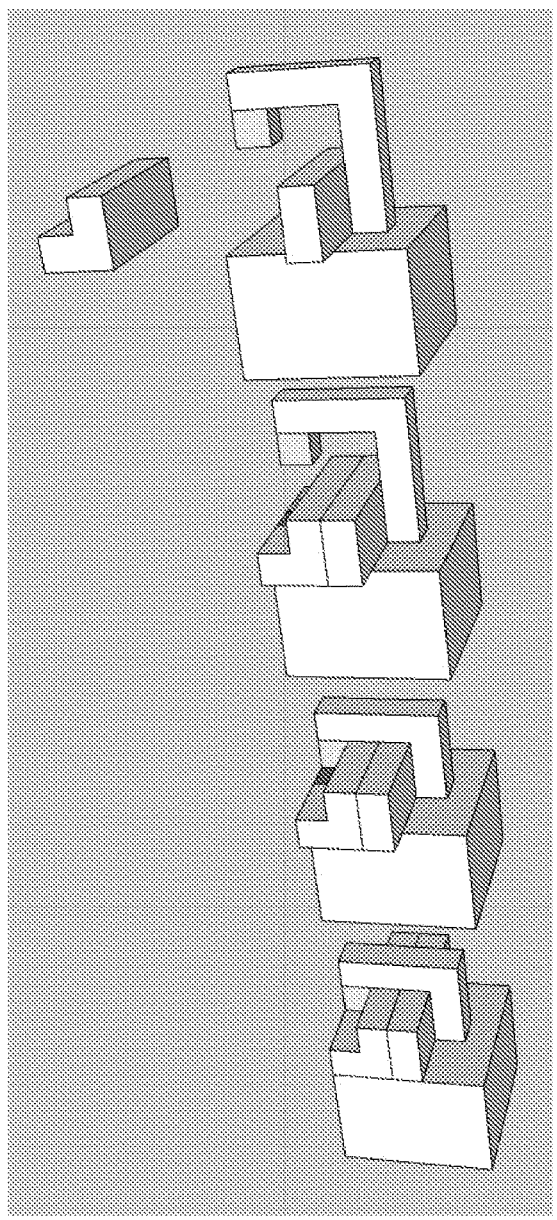
Figure 11C:
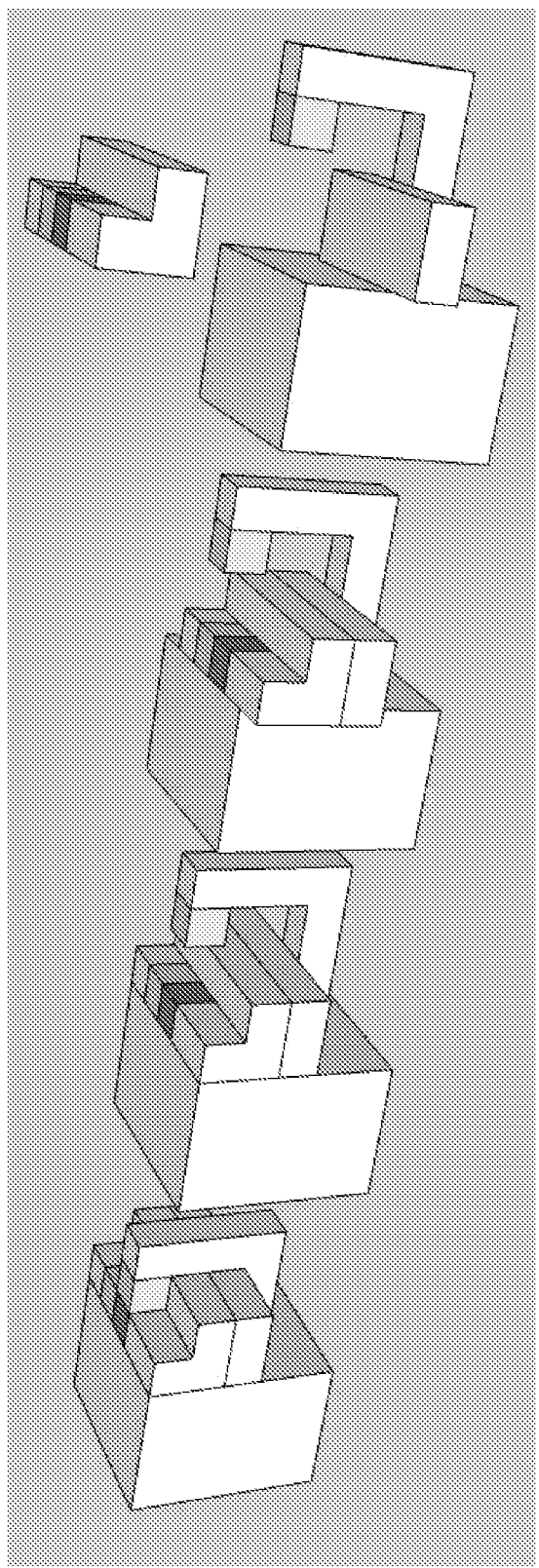

Referring now to FIGS. 11A to 11C, there will now be described a linear clamping and unclamping mechanism that can be used to attach first and second apparatus. These apparatus may be, for example, a pram frame (with wheels) and a pram carry cot. Part 100 is attached, in this example, to the carry cot, whilst part 200 is attached to the pram frame. The clamp is identified by numeral 300, whilst part 400 is an actuator. The part 100 is provided with a pair of linearly spaced magnets that are alternately aligned so that one of the magnets presents a positive end (green) to the clamp 300 whilst the other magnet presents a negative end (red). The clamp 300 is provided with a magnet that presents a positive end (green) to the part 100. The clamp 200 is slidably mounted within the actuator so that it can move between clamping and unclamping positions (generally from left to right in the Figures).

The sequence in FIG. 11A illustrates the transition from clamped to unclamped, progressing from left to right. In the leftmost illustration, opposite poles on the clamp and part 100 are aligned, meaning that the clamp is held against the part 100, clamping parts 100 and 200 together. In order to unclamp the parts, the actuator is slid in the minus Y direction relative to parts 100 and 200, with the clamp 300 also moving (second illustration). This results in the alignment of the positive poles (green), causing the clamp 300 to be pushed away (repelled) from part 100, sliding out of the actuator in the minus X direction (third illustration). This allows the part 100 to be moved in the Z direction separating it from part 200 (fourth illustration). FIG. 11B illustrates this same sequence of step, clamped to unclamped, from a different perspective.

Figure 12A:
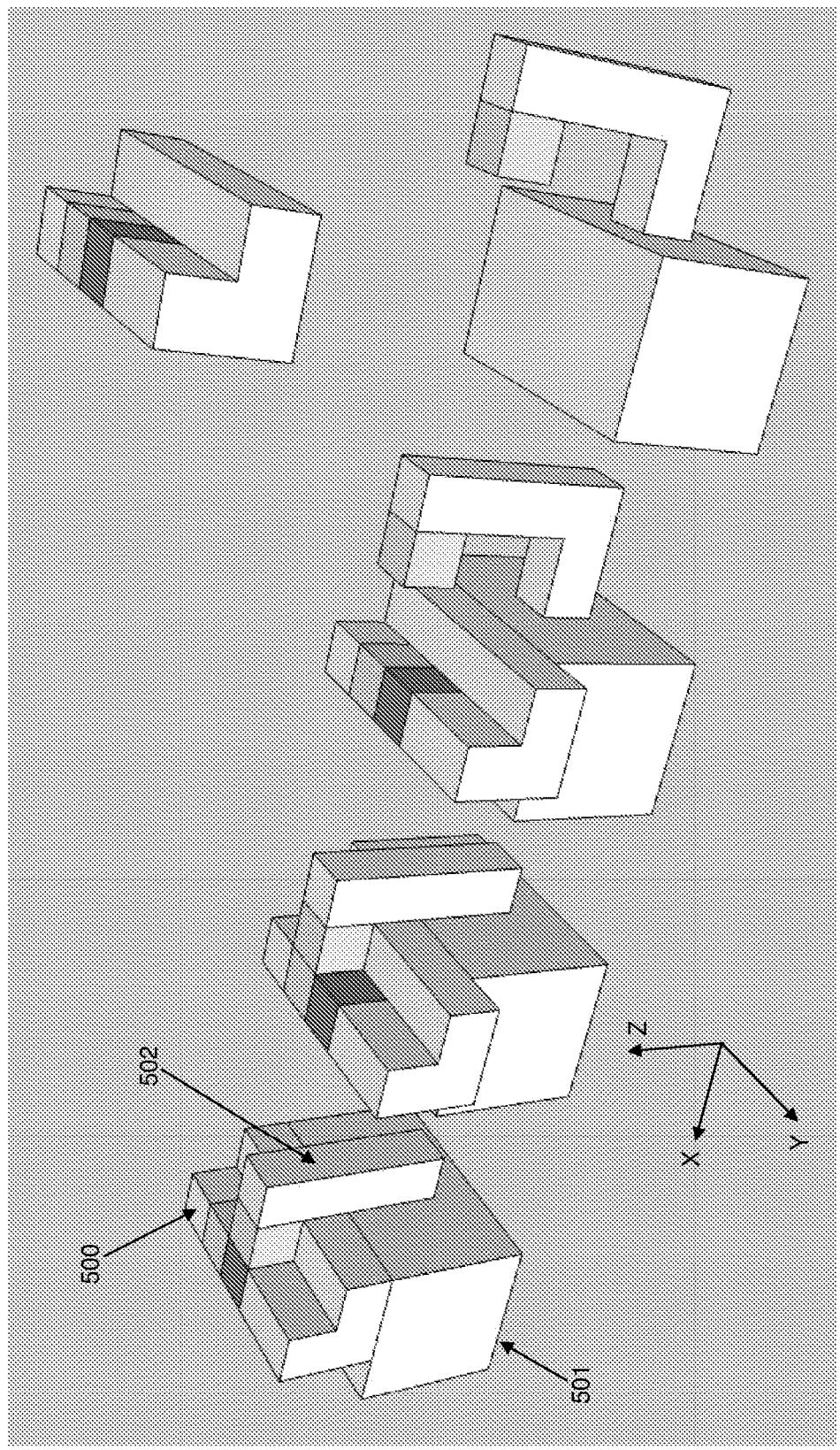
FIG. 12 illustrates an alternative linear clamping and unclamping mechanism.
Figure 12B:
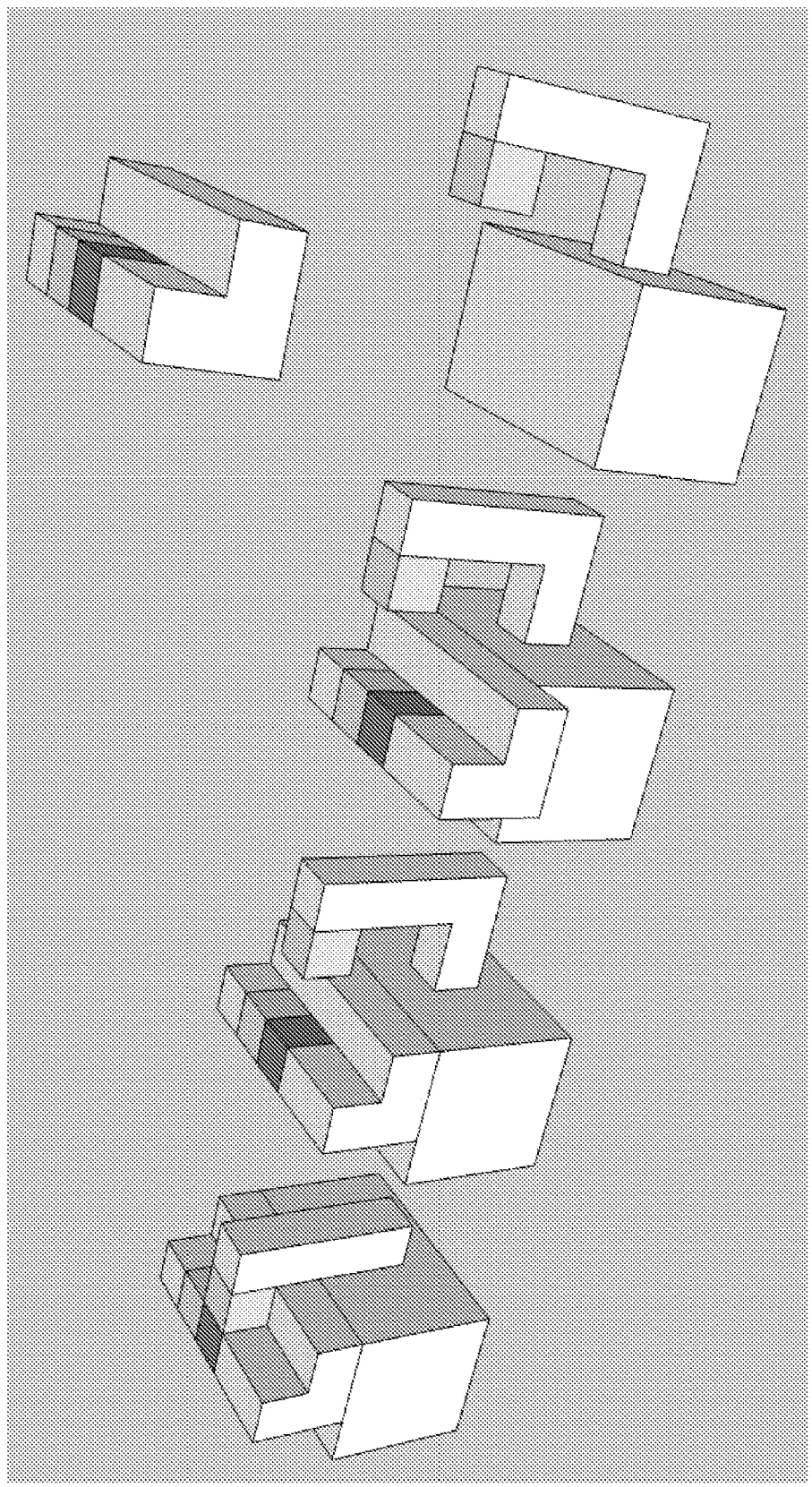

Referring now to FIGS. 12A to 12C, an alternative linear mechanism will now be described. In this mechanism, part 500 may be connected to a pram carry cot whilst part 501 may be connected to the pram frame. A clamp 502 is slideably engaged with a slot in the part 501 so that it can move in the X direction between clamped and unclamped positions. It is assumed that parts 501 and 502 are inaccessible, whilst part 500 can be moved by a user.

FIG. 12A shows the sequence of operations involved in moving between clamped and unclamped positions (from left to right). In the leftmost illustration, the positive (green) and negative (red) poles on parts 500 and 502 are aligned, resulting in attraction and therefore clamping of the parts. In order to unclamp, the user moves part 502 in the Y direction relative to the other parts, thereby aligning the positive (green) poles (second illustration). This causes parts 500 and 502 to be repelled, with the clamp 502 sliding outwards in the slot of part 501 (third illustration). This allows part 500 to be lifter away from part 501 (fourth illustration). FIG. 12B illustrates the corresponding sequence of steps to move from an unclamped to a clamped position (moving from right to left).

With reference to FIGS. 11 and 12 it is noted that, in moving from the clamped to the unclamped positions, a mechanical force may be used to cause or assist separation of the parts. For example, referring to FIG. 11A a ramp may be provided on the surface 101 of the part 100 that faces in the minus X direction. This ramp causes the clamp 300 to move in the minus X direction as the actuator 400 slides in the Z direction. A spring or other biasing means may additionally or alternatively be used to aid separation of the parts.

Possible applications of the one and two actuating step systems described in this patent include the attachment of electronic devices on or inside a vehicle (such as a bike, a car, a lorry, a plane, a train, a wheelchair etc . . . ) or on some walls (such as the walls of a house or of a flat etc . . . ). They also include the attachment of a pram to a push chair.

The invention claimed is:

1. A clamping mechanism comprising:
   a first part provided with a first magnetic component;
   a second part; and
   a third part provided with a second magnetic component and being coupled to the second part,
   wherein bringing the first and second parts together along an axis causes rotational alignment and relative radial movement of the first and second magnetic components to effect axial clamping of the first part to the second part, and wherein relative rotation of the first and third parts to misalign the first and second magnetic components reverses this radial movement and effects unclamping of the first and second parts.

2. A clamping mechanism according to claim 1, wherein the third part is housed substantially within the second part and is rotatable within the second part.

3. A clamping mechanism according to claim 2, wherein bringing the first and second parts together along said axis causes the third part to rotate within the second part in order to align the first and second magnetic components.

4. A clamping mechanism according to claim 1, wherein the third part comprises an actuator rotatable within the second part and two or more clamps rotatable with the actuator but radially movable relative thereto, said second magnetic component comprising a plurality of magnets disposed on the clamps.

5. A clamping mechanism according to claim 4, wherein said first part defines a hole surrounded by a clamping surface, the hole being dimensioned to accept said clamps when the clamps are in an unclamped position and the first second parts are brought together, each said clamp being configured to clamp over the clamping surface to effect said axial clamping.

6. A clamping mechanism according to claim 5, wherein said hole is generally circular, said clamping surface being an annular surface.

7. A clamping mechanism according to claim 5, said clamping surface being bevelled.

8. A clamping mechanism according to claim 1, said first and second parts comprising cooperating features to prevent relative rotation of the first and third parts when axial clamping is effected.

9. A clamping mechanism according to claim 1 and comprising cooperating features to prevent relative rotation of the first and third parts when axial clamping is effected and biasing means for biasing said cooperating features into locking engagement, the mechanism being configured such that a compressive force applied against said biasing means via said first part moves the cooperating features out of locking engagement, thereby allowing relative rotation of the first and third parts to misalign the magnetic components and thereby effect unclamping of the first and second parts.

10. A clamping mechanism according to claim 9, wherein said biasing means comprises one or more springs.

11. A clamping mechanism according to claim 1, wherein the first and second magnetic components each comprise one or more pairs of diametrically aligned dipole magnets.

12. A clamping mechanism according to claim 1, said first and second parts being configured for releasable attachment to respective apparatus in order to allow those apparatus to be releasably clamped together.

* * * * *